Dec. 2, 1947.   G. TRAUTVETTER   2,432,072
VEHICLE SEAT WITH LEG SUPPORT
Filed Nov. 8, 1943

INVENTOR
George Trautvetter
BY John P. Tarbot
ATTORNEY

Patented Dec. 2, 1947

2,432,072

UNITED STATES PATENT OFFICE 2,432,072

VEHICLE SEAT WITH LEG SUPPORT

George Trautvetter, Jenkintown, Pa., assignor to The Budd Company, Philadelphia, Pa., a corporation of Pennsylvania Application November 8, 1943, Serial No. 509,362

2 Claims. (Cl. 155—169)

The invention refers to seats, especially seats of rail cars. More particularly the invention refers to an improvement in seats having a support for the legs and feet of the occupants in the form of an extension cushion or ottoman. Still more specifically the invention refers to an improvement of the subject matter of the copending application Serial No. 509,380, filed Nov. 8, 1943, for Seating arrangement and construction, of Earl J. W. Ragsdale and Joseph Ledwinka.

The object of the invention is the provision of a space, pocket or compartment for the occupants of seats of the indicated type which is easily accessible on the one hand, yet which keeps the contents completely inaccessible and safe when the seat occupants should be asleep.

The object of the invention is achieved by the provision of a pocket or compartment in the extension cushion or ottoman which is open on that side of the latter resting against the seat cushion when the extension or ottoman is used as a rest for the legs.

The invention, its objects and advantages will be more clearly understood from the embodiment illustrated in the attached drawing.

Figure 1:
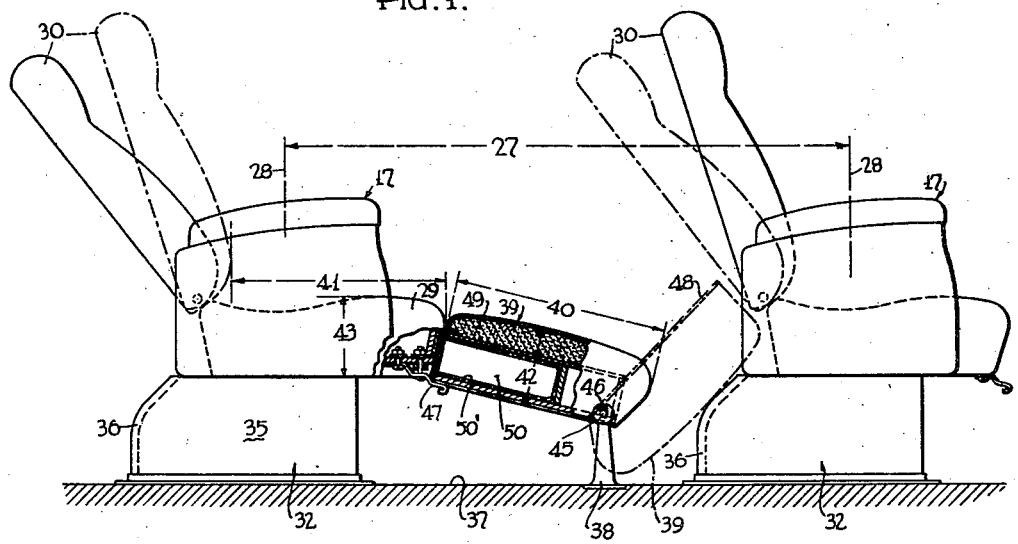
Fig. 1 is a side elevation of two successive seats or double seats with the seat extension or ottoman for one of the seats partly in section.

The seats or double seats are designated as a whole by the numeral 17. The distance 27 between successive transverse middle lines 28 of the seats 17, is substantially greater than customary for cars with reclining seats which cars are now quite popular under the name sleeper coaches. The spacing 27 is in illustrated embodiment about 52½ inches.

The construction of each seat or pair of seats 17, with its seat cushion 29, its swingable back rest 30 and its arm rests 31 may be of substantially conventional design.

In the illustrated embodiment, the double seat 17 is supported by a structure 32 and on the side of the outer wall 33 by a bracket 34. The structure 32 comprises a longitudinally extending wall 35 along the aisle and a back wall 36 which extends from the wall 35 to about the outer body wall 33 and is attached to the floor 37. The structure 32 offers beneath the seat cushions 29 luggage space for the seat occupants and its rear wall 36 serves for an additional purpose which will become apparent later on.

At about two-thirds of the distance between two double seats are secured pairs of brackets 38 to the floor 37, one pair of brackets for each individual seat. A cushion 39 of similar length 40 and of similar thickness 42 as the effective length 41 and thickness 43, respectively, of the seat cushion 29, but of less width, is journalled rotatably about a transverse horizontal axis 44 to the upper ends of a pair of brackets 38 in front of each individual seat 17. The cushion 39 is provided for this purpose near one of its lower transverse margins with two pins or studs 45 which fit into upwardly open slots 46 of the brackets 38. The pin and slot connection provides for easy removal of the cushions 39 which is helpful in case of repair and floor cleaning.

Attached to the underside of the seat cushion 29 is a forwardly extending bracket 47 which serves as a support for the rear lower transverse edge of the cushion 39 when the latter is in the position shown in full lines in Figure 1. In this position the cushion 39 forms an extension for the seat cushion 29 so as to form a comfortable support for the legs of the occupant allowing him to rest in semi-lying position when the back rest 30 is simultaneously in its lowered or reclining position.

This provision for supporting the legs and feet of the travelers at about the same level with the seat cushion greatly contributes to comfortable and refreshing rest and sleep.

Figure 2:
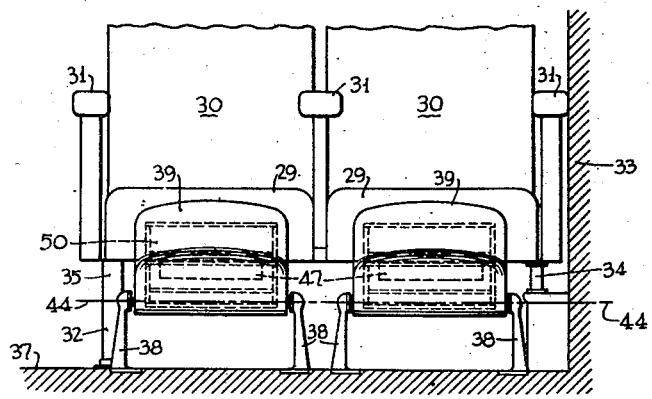
Fig. 2 is a front elevation of one of the double seats shown in Fig. 1.

The space between the cushion or seat extension 39, which may be termed an ottoman, and the next forward seat is such that it permits a person to pass into the aisle if the ottoman of seat at the aisle along a row of seats should be in the rest position illustrated on the left side of Figure 2. It also permits the occupant to stand in front of his seat with lowered ottoman for arranging blankets, etc., prior to occupying the seat.

The ottoman 39 may be swung from the position shown in full lines in Figure 1 about the axis 44 into the position shown in dot-and-dash lines in the same figure where it rests against the back wall 36 of the next seat in front. The upper part of the back wall 36 is inclined for this purpose and a recess is left free under the back rest and behind the seat cushion 29 of the next seat so as to accommodate the upper corner of the ottoman 39 as clearly shown in Figure 1. When the ottoman is swung upwardly and forwardly into the dot-and-dash position, its lower edge is kept slightly above the ground so that it will not get soiled. Moreover, it leaves in this position ample space for the seat occupants to stand in and step into the space between the brackets 38 and the seat or to rest their feet on the floor 37 in the space while sitting. The upturned underside 48 of the ottoman 39 presents itself as inclined foot rest.

The upper side of the ottoman 39 is softly upholstered as indicated at 49.

A receptacle or compartment 50 is formed in the ottoman and serves for handbangs or other small articles. This compartment is closed by the front side of the seat cushion 29 when the ottoman is in its substantially horizontal position but becomes accessible by turning the ottoman upwardly. The compartment becomes also closed by the back of the seat ahead. The compartment or recess is lined with a bag 50' attached at the opening whereas the remainder is loose; this permits emptying of dirt or small articles by the simple process of turning the bag inside out.

The compartment 50 is preferably formed by walls which serve at the same time as the skeleton or support for the upholstery 49.

The form and construction of the compartment 50 will, of course, vary in accordance with the form and dimension of the ottoman 39 and other considerations. Any modifications based on the disclosed idea, as will doubtlessly occur to those skilled in the art, are intended to be covered by the attached claims.

What is claimed is:

1. In a seat, a seat cushion, a seat extension supported swingably about a horizontal axis into two positions, one position in which said extension abuts with one of its sides said seat cushion and has its supporting surface in approximately the same horizontal plane as the supporting surface of said seat cushion and another upright position in which the abutting side faces upwardly, a receptacle in said extension for small articles such as handbags, said receptacle having its access opening in said abutting side so that it is closed when said extension abuts the seat but becomes accessible when said extension is in the upright position.

2. In a seat having a seat cushion and a leg support; means supporting the leg support in front of said cushion for movement of the leg support relative to said cushion into either one of two positions: one position in which the leg support has one side in juxtaposition to the front side of the cushion and forms an extension of the latter, and the other position in which the same side of the leg support is spaced from and, in front of the cushion and faces upwardly; a receptacle on said leg support with an opening in the aforesaid side of the leg support so that the opening is blocked by the cushion in the first described position but becomes accessible in the second described position of the leg support.

GEORGE TRAUTVETTER.

REFERENCES CITED

The following references are of record in the file of this patent:

UNITED STATES PATENTS

| Number | Name | Date |
|---|---|---|
| 2,093,861 | Bunevac | Sept. 21, 1937 |
| 2,037,945 | Stockil | Apr. 21, 1936 |
| 1,333,554 | Melcher | Mar. 9, 1920 |
| 1,452,915 | Kennedy | Apr. 24, 1923 |
| 1,079,606 | Ronney | Nov. 25, 1913 |
| 245,833 | Imse | Aug. 16, 1881 |
| 815,046 | Sherman | Mar. 13, 1906 |

FOREIGN PATENTS

| Number | Country | Date |
|---|---|---|
| 8,742 | Germany | 1880 |
| 223,744 | Great Britain | Oct. 30, 1924 |